United States Patent
Kim et al.

(10) Patent No.: US 8,102,348 B2
(45) Date of Patent: Jan. 24, 2012

(54) IN-PLANE SWITCHING MODE LIQUID CRYSTAL DISPLAY DEVICE

(75) Inventors: Do Sung Kim, Gyeongsangbuk-Do (KR); Do Young Lee, Seoul (KR)

(73) Assignee: LG Display Co., Ltd., Seoul (KR)

( * ) Notice: Subject to any disclaimer, the term of this patent is extended or adjusted under 35 U.S.C. 154(b) by 1049 days.

(21) Appl. No.: 11/159,299

(22) Filed: Jun. 23, 2005

(65) Prior Publication Data

US 2006/0145990 A1    Jul. 6, 2006

(30) Foreign Application Priority Data

Dec. 31, 2004 (KR) .................. 10-2004-0118352

(51) Int. Cl.
*G09G 3/36* (2006.01)
(52) U.S. Cl. .......................... 345/92; 349/141
(58) Field of Classification Search ............ 345/55, 345/87, 94, 95, 90, 92; 349/141, 143
See application file for complete search history.

(56) References Cited

U.S. PATENT DOCUMENTS

| | | | |
|---|---|---|---|
| 5,681,675 A * | 10/1997 | Kurauchi et al. | 430/20 |
| 5,745,207 A * | 4/1998 | Asada et al. | 349/141 |
| 5,859,683 A * | 1/1999 | Tagusa et al. | 349/138 |
| 6,323,850 B1 * | 11/2001 | Katakura et al. | 345/204 |
| 6,342,937 B2 * | 1/2002 | Hiroshi | 349/141 |
| 6,577,289 B1 * | 6/2003 | Asao et al. | 345/87 |
| 6,618,029 B1 * | 9/2003 | Ozawa | 345/82 |
| 6,862,067 B2 * | 3/2005 | Matsumoto et al. | 349/141 |
| 6,888,601 B2 * | 5/2005 | Asai et al. | 349/141 |
| 6,891,522 B2 * | 5/2005 | Song et al. | 345/87 |
| 7,009,206 B2 * | 3/2006 | Lee et al. | 257/72 |
| 7,133,110 B2 * | 11/2006 | Sasaki et al. | 349/156 |
| 7,286,108 B2 * | 10/2007 | Tsuda et al. | 345/92 |
| 7,317,503 B2 * | 1/2008 | Lee et al. | 349/141 |
| 7,327,429 B2 * | 2/2008 | Kim et al. | 349/141 |
| 2002/0008827 A1 * | 1/2002 | Yoo et al. | 349/141 |
| 2002/0057411 A1 * | 5/2002 | Kim et al. | 349/141 |
| 2002/0163604 A1 * | 11/2002 | Kim et al. | 349/43 |
| 2003/0128323 A1 * | 7/2003 | Matsumoto et al. | 349/141 |
| 2004/0109122 A1 * | 6/2004 | Kumagawa et al. | 349/143 |
| 2004/0114082 A1 * | 6/2004 | Lee | 349/141 |
| 2004/0212770 A1 * | 10/2004 | Lee | 349/141 |
| 2004/0263750 A1 * | 12/2004 | Chae | 349/141 |
| 2005/0078258 A1 * | 4/2005 | Kim et al. | 349/141 |
| 2005/0099568 A1 * | 5/2005 | Kim et al. | 349/141 |

\* cited by examiner

*Primary Examiner* — Chanh Nguyen
*Assistant Examiner* — Pegeman Karimi
(74) *Attorney, Agent, or Firm* — McKenna Long & Aldridge, LLP.

(57) ABSTRACT

An in-plane switching mode liquid crystal display device includes first and second substrates, a gate line on the first substrate, a data line crossing the gate line defining a unit pixel region, a thin film transistor at the crossing of the gate line and the data line, a pixel electrode line in parallel with the data line, a plurality of pixel electrodes formed to be protruded in an extended direction of the gate line from the pixel electrode line, a common electrode line adjacent to a data line of a neighboring pixel in the extended direction of the gate line and in parallel therewith, a plurality of common electrodes protruded from the common electrode line and alternately arranged in parallel with the plurality of pixel electrodes to generate an in-plane electric field, and a liquid crystal layer between the first and second substrates.

17 Claims, 10 Drawing Sheets

RUBBING DIRECTION

RUBBING DIRECTION

FIG. 6A

| R | G | B | R | G | B | R | G | B | R | G | B |
|---|---|---|---|---|---|---|---|---|---|---|---|
| + | + | − | − | + | + | − | − | + | + | − | − |
| − | − | + | + | − | − | + | + | − | − | + | + |
| + | + | − | − | + | + | − | − | + | + | − | − |
| − | − | + | + | − | − | + | + | − | − | + | + |

ODD FRAME

FIG. 6B

| R | G | B | R | G | B | R | G | B | R | G | B |
|---|---|---|---|---|---|---|---|---|---|---|---|
| − | − | + | + | − | − | + | + | − | − | + | + |
| + | + | − | − | + | + | − | − | + | + | − | − |
| − | − | + | + | − | − | + | + | − | − | + | + |
| + | + | − | − | + | + | − | − | + | + | − | − |

EVEN FRAME

IN-PLANE SWITCHING MODE LIQUID CRYSTAL DISPLAY DEVICE

The present invention claims the benefit of Korean Patent Application No. P2004-118352 filed in Korea on Dec. 31, 2004, which is hereby incorporated by reference.

BACKGROUND OF THE INVENTION

1. Field of the Invention

The present invention relates to a liquid crystal display (LCD) device, and more particularly, to an in-plane switching (IPS) mode LCD capable of preventing signal interference of a data line and reducing a vertical line deficiency.

2. Discussion of the Related Art

Recently, as various mobile electronic devices including a mobile phone, a PDA or a notebook computer are being developed, demands for a light, thin, short and small flat panel display device which may be applied to the mobile electronic devices are increasing. Thus, researches for flat panel display devices such as a liquid crystal display (LCD), a plasma display panel (PDP), a field emission display (FED), and a vacuum fluorescent display (VFD) are actively ongoing. Among these display devices, the LCD is most spotlighted because it provides easy mass-production, easiness of a driving unit, and high picture quality.

In general, an LCD device implements an image by controlling light by using an electric field, including a liquid crystal panel on which pixels are arranged in a matrix form and a driving circuit for driving the liquid crystal panel.

FIG. 1 illustrates a unit pixel region of the related art IPS mode LCD. As shown in FIG. 1, a gate line 1 and a data line 10 are arranged to cross each other to define pixel regions on a first substrate of the liquid crystal panel. A gate electrode 9, a semiconductor layer (not shown) and source/drain electrodes 13 and 15 are formed at the crossing of the gate line 1 and the data line 10, thereby forming a switching device of a thin film transistor TFT.

A pixel electrode 3 and a common electrode 5 are alternately disposed at each pixel region of the liquid crystal panel to generate an in-plane electric field (i.e., horizontal electric field) on the first substrate. The pixel electrode 3 receives a data signal from the source/drain electrodes 13 and 15 of the switching device TFT and generates the in-plane electric field with the common electrode 5 on the first substrate.

In other words, the gate electrode 9 and the source/drain electrodes 13 and 15 are connected with the gate line 1 and the data line 10, respectively, to turn on the switching device TFT with a signal inputted through the gate line 1 and to transfer a data signal applied through the data line 10 to the pixel electrode 3. As a result, the LCD displays an image by controlling the light transmittance of liquid crystal molecules with the in-plane electric field formed between the pixel electrode 3 and the common electrode 5 according to the data signal supplied to each pixel region.

Although not shown in the drawing, a color filter layer is formed on a second substrate, and a liquid crystal layer is formed at a space between the first and second substrates. In such an IPS mode LCD, liquid crystal molecules of the liquid crystal layer are driven by the in-plane electric field formed between the pixel electrode and the common electrode. As such, a visible range widens compared to the conventional twisted nematic (TN) mode LCD, namely, obtaining a viewing angle of about 80°~85° in all directions (i.e., up/down and left/right directions).

However, in the conventional IPS mode LCD, the data line 10 and the pixel electrode 3 are adjacently disposed in parallel. Thus, a signal interference can be easily generated between the data line 10 and the pixel electrode 3, thereby causing a cross-talk and a light leakage phenomenon.

Accordingly, in an effort to solve such a problem, an outermost common electrode 5' is disposed near the data line 10 and has a width greater than the other common electrode 5. However, such an electrode disposition structure degrades an aperture ratio of the LCD and distorts of the electric field because a signal interference of the data line cannot be effectively prevented.

FIGS. 2A and 2B are enlarged views of the region 'I' shown in FIG. 1. With reference to FIGS. 2A and 2B, a distortion of the liquid crystal array due to a signal interference according to a voltage variation of the data line will be described in detail.

A rubbing direction inducing an initial arrangement of liquid crystal molecules has about 45° tilt to the common electrodes 5 and 5' and the pixel electrode 3, and an in-plane electric field generated, when a voltage is applied to the common electrodes 5 and 5' and the pixel electrode 3, is perpendicular to the common electrodes 5 and 5' and the pixel electrode 3.

FIG. 2A shows that when a voltage of 8V is applied to the data line 10 and voltages of 5V and 8V are respectively applied to the common electrodes 5 and 5' and the pixel electrode 3, a director of the liquid crystal molecules is determined as a first direction 30 by the in-plane electric field generated due to a voltage difference between the common electrodes 5 and 5' and the pixel electrode 3.

In FIG. 2B, a voltage of 8V is applied to the data line 10 and voltages of 5V and 8V are applied respectively to the common electrodes 5 and 5' and the pixel electrode 3. If the 8V applied to the data line 10 is changed to 10V, a direction of the electric field generated on the actual driving region of the liquid crystal molecules is changed. As a result, a second direction 35 is rotated more than the first direction 30 shown in FIG. 2A.

A voltage change of the data line distorts the direction of the electric field in the pixel region, thereby causing a change in the arrangement of liquid crystal molecules. Therefore, even if the same voltage is applied to the common electrodes and the pixel electrode, color sense can be changed on a display screen.

SUMMARY OF THE INVENTION

Accordingly, the present invention is directed to an in-plane switching mode liquid crystal display device that substantially obviates one or more of the problems due to limitations and disadvantages of the related art.

An object of the present invention is to provide an in-plane switching mode liquid crystal display device that can prevent degradation of picture quality due to a signal interference of a data line by forming a rubbing direction perpendicular to the data line and disposing a common electrode and a pixel electrode according to the rubbing direction.

Another object of the present invention is to provide an in-plane switching mode liquid crystal display device that can prevent a vertical line phenomenon on a display screen, especially in driving a horizontal 2-dot inversion system by separately disposing a pixel electrode line and a pixel electrode from a data line of an adjacent pixel, to thereby minimize parasitic capacitance generated by a data signal of the data line.

Additional features and advantages of the invention will set forth in the description which follows, and in part will be apparent from the description, or may be learned by practice of the invention. The objectives and other advantages of the invention will be realized and attained by the structure particularly pointed out in the written description and claims hereof as well as the appended drawings.

To achieve these and other advantages and in accordance with the purpose of the present invention, as embodied and broadly described herein, An in-plane switching mode liquid crystal display device includes first and second substrates, a gate line on the first substrate, a data line crossing the gate line defining a unit pixel region, a thin film transistor at the crossing of the gate line and the data line, a pixel electrode line in parallel with the data line, a plurality of pixel electrodes formed to be protruded in an extended direction of the gate line from the pixel electrode line, a common electrode line adjacent to a data line of a neighboring pixel in the extended direction of the gate line and in parallel therewith, a plurality of common electrodes protruded from the common electrode line and alternately arranged in parallel with the plurality of pixel electrodes to generate an in-plane electric field, and a liquid crystal layer between the first and second substrates.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

In the drawings:

FIGS. 6A and 6B illustrate polarity patterns of a data signal of a horizontal 2-dot inversion system applied to a liquid crystal panel in accordance with an embodiment of the present invention;

DETAILED DESCRIPTION OF THE ILLUSTRATED EMBODIMENTS

Reference will now be made in detail to the preferred embodiments of the present invention, examples of which are illustrated in the accompanying drawings.

Figure 1:
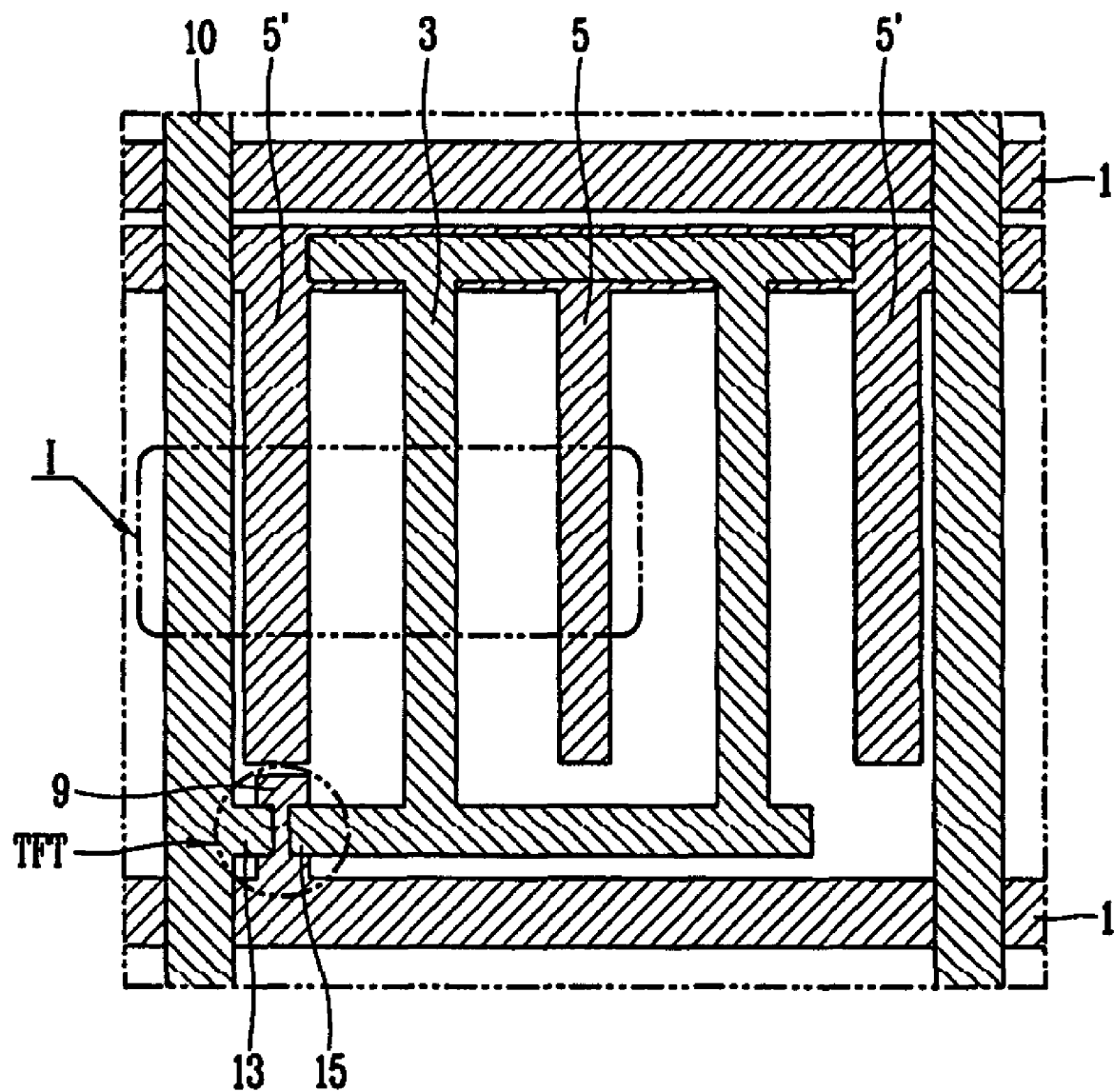
FIG. 1 is a plan view showing a unit pixel of a related art LCD device.
Figure 2A:
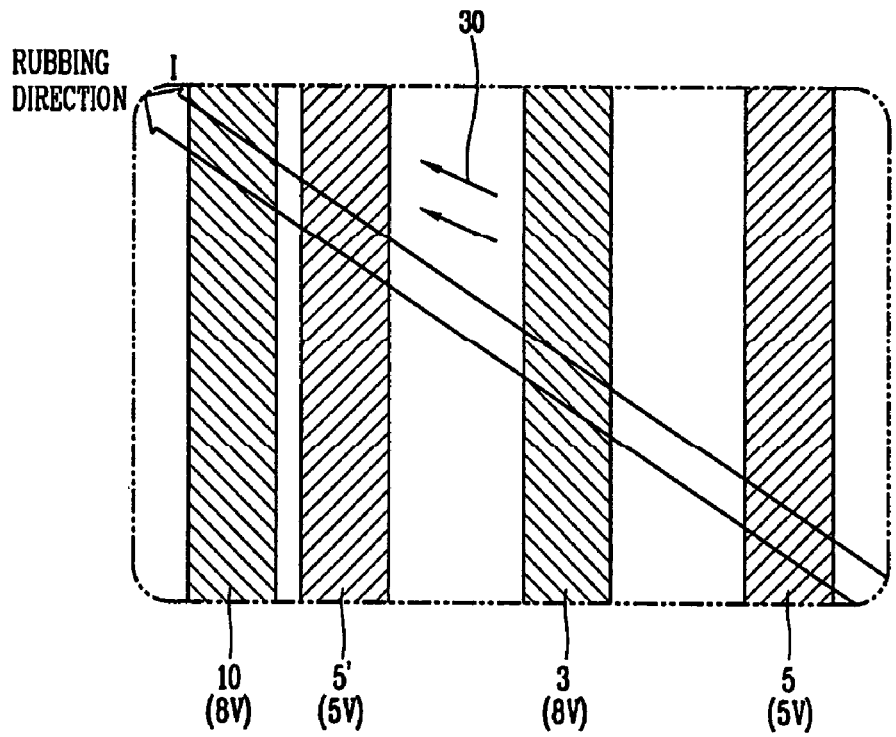
FIGS. 2A and 2B are enlarged views of the region I shown in FIG. 1.
Figure 2B:
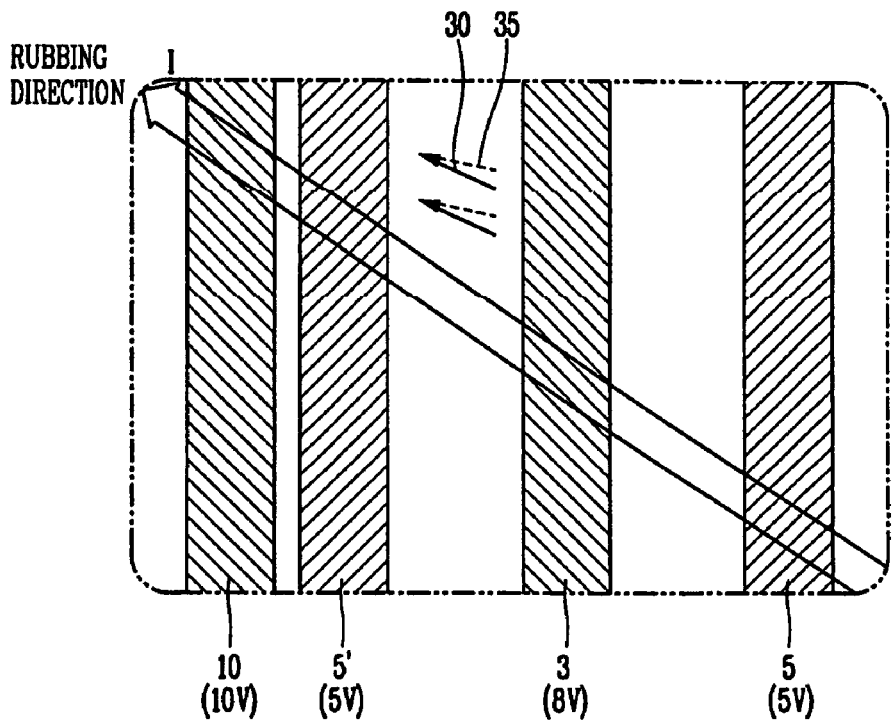
Figure 3:
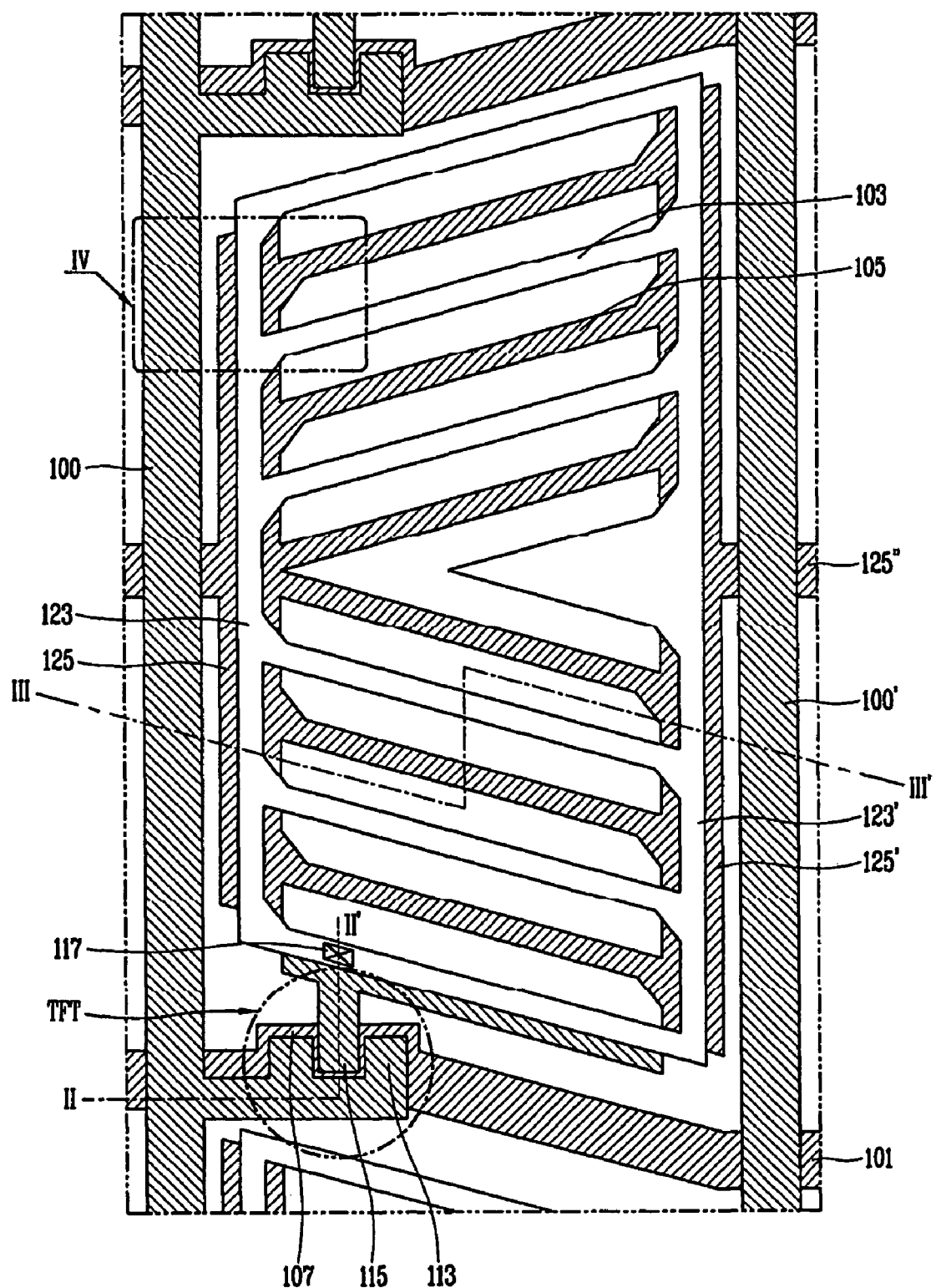
FIG. 3 is a plan view showing a unit pixel of a liquid crystal display device in accordance with a first embodiment of the present invention.
Figure 4A:
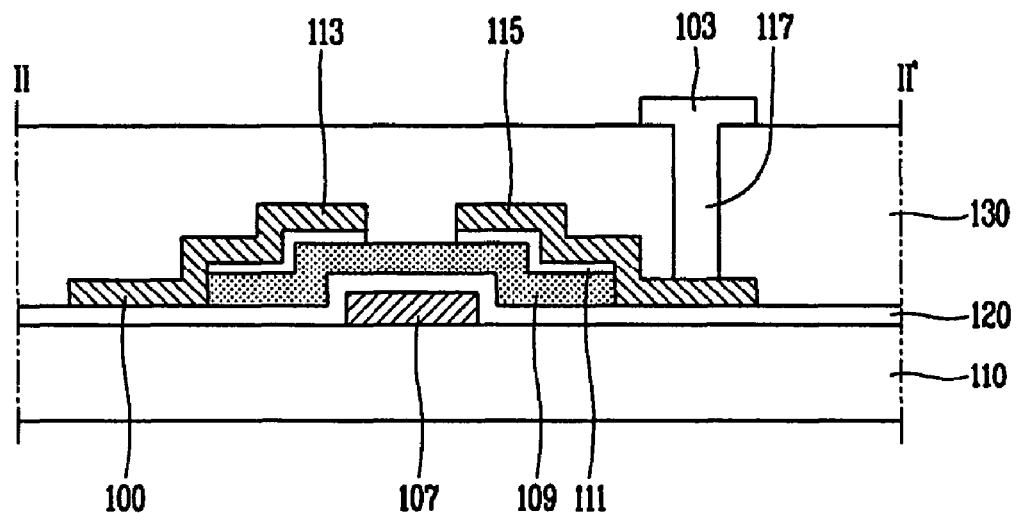
FIGS. 4A and 4B are cross-sectional views taken along lines II-II' and III-III' of FIG. 3, respectively.
Figure 4B:
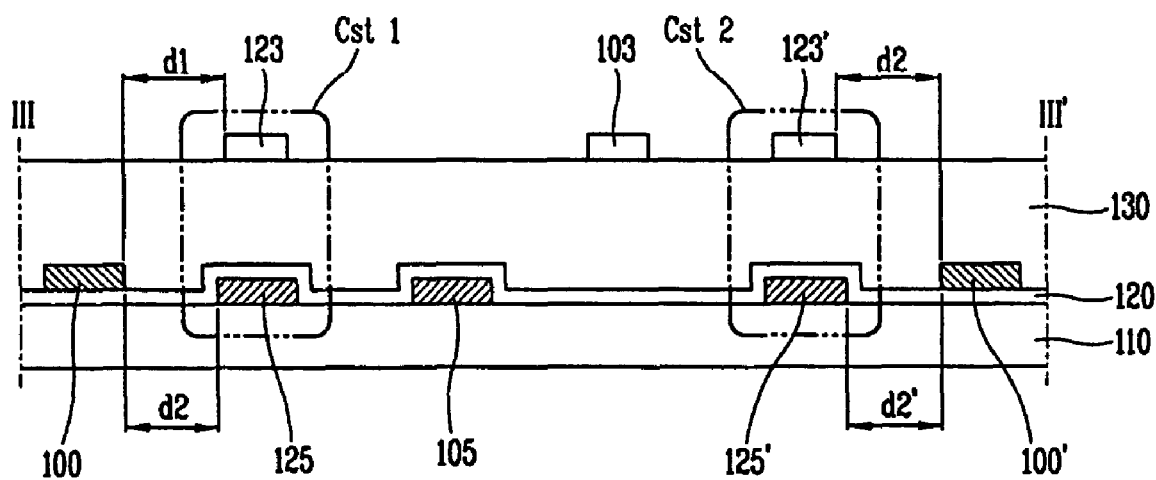

FIG. 3 is a plan view showing a unit pixel of a liquid crystal display (LCD) device in accordance with a first embodiment of the present invention, while FIGS. 4A and 4B are cross-sectional views taken along lines II-II' and III-III' of FIG. 3.

As shown in FIG. 3, a liquid crystal panel includes a data line 100 and a gate line 101 arranged on a first substrate 110 (shown in FIGS. 4A and 4B) and defining a unit pixel region, a thin film transistor TFT as a switching device disposed at each crossing of the data line 100 and the gate line 101, and at least one pixel electrode 103 and a common electrode 105 alternately arranged in parallel to each other in the pixel region and generating an in-plane electric field.

In this case, though not shown, an alignment film rubbed in a direction perpendicular to the data line 100 is formed on the first substrate 110, and the pixel electrode 103 and the common electrode 105 are formed with a tilt angle within a range of about 0°~45° in a direction perpendicular to the data line 100 to correspond to the rubbing direction of the alignment film.

The switching device TFT includes a gate electrode 107 formed as a portion of the gate line 101 on the first substrate 110, a gate insulation film 120 made of SiNx or SiOx formed on the gate electrode 107, a semiconductor layer 109 (i.e., channel region), an ohmic contact layer 111 formed on the semiconductor layer 109, a source electrode 113 formed as an extended portion of the data line 100, and a drain electrode 115 formed spaced apart from the source electrode 113.

A passivation film 130 made of SiNx or SiOx is formed over the entire surface of the first substrate 110 including the switching device TFT. The pixel electrode 103 as a transparent conductor made of one of indium tin oxide (ITO), indium zinc oxide (IZO) and indium tin zinc (ITZO) is formed on the passivation film 130. The pixel electrode 103 is connected with the drain electrode 115 of the switching device TFT through a first contact hole 117 formed at the passivation film 130 to receive a data signal.

Further, in the unit pixel shown in FIG. 3, a first pixel electrode line 123 disposed in parallel with the data line 110, and a second pixel electrode line 123' disposed in parallel with a data line 100' of the pixel adjacent in an extended direction of the gate line 101, thereby electrically connecting with a plurality of pixel electrodes 103. Also, a first common line 125 and a second common line 125' are formed at a lower portion of the first and second pixel electrode lines 123 and 123', thereby electrically connecting with a plurality of common electrodes 105.

Herein, the first common line 125 and the first pixel electrode line 123 and the second common line 125' and the second pixel electrode 123' vertically overlap with the gate insulation film 120 and the passivation film 130 interposed therebetween, thereby forming first and second storage capacitors Cst1 and Cst2.

The LCD device of an embodiment of the present invention may further include a third common line 125" (shown in FIG. 3) for applying a common signal to the first and second common lines 125 and 125'. In such a case, the pixel electrode 103 and the common electrode 105 formed with a certain tilt angle with respect to the data line 110 are symmetrically disposed based on an extended direction of the third common line 125", thereby to form two domains in the pixel region.

The gate line 101 can be formed to be parallel to the adjacent pixel electrode 103 or common electrode 105 and can extend in a zig-zag form over the entire region of the liquid crystal panel, and two pixel regions adjacent at the boundary of the gate line 101 can be symmetrically formed. Also, the pixel region of the LCD device can be symmetrically formed with an adjacent pixel region at the boundary of the data line 100'. In addition, a light blocking layer (i.e., black matrix), a color filter layer formed of R, G, B color filters and an overcoat layer can be sequentially formed on a second substrate (not shown) for preventing leakage of light.

Figure 4C:
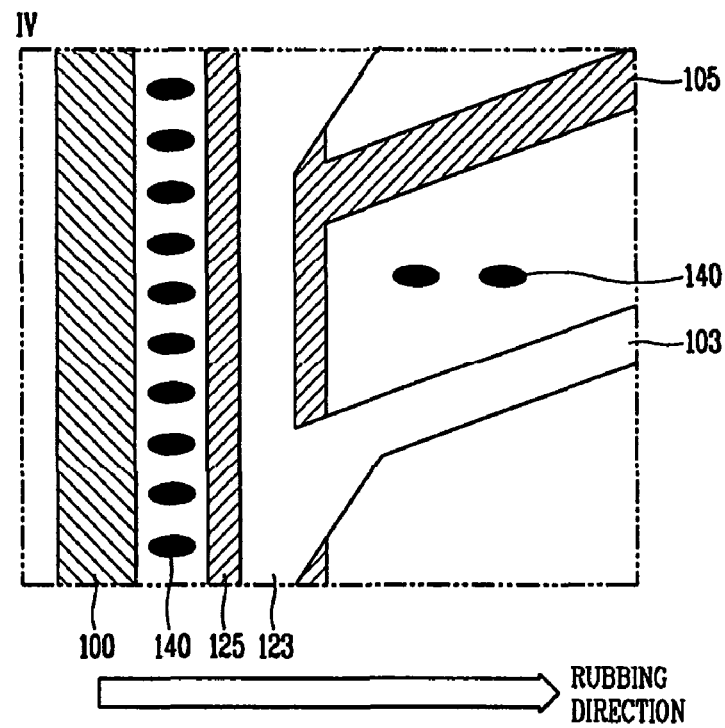
FIGS. 4C and 4D are enlarged views of the region IV shown in FIG. 3.
Figure 4D:
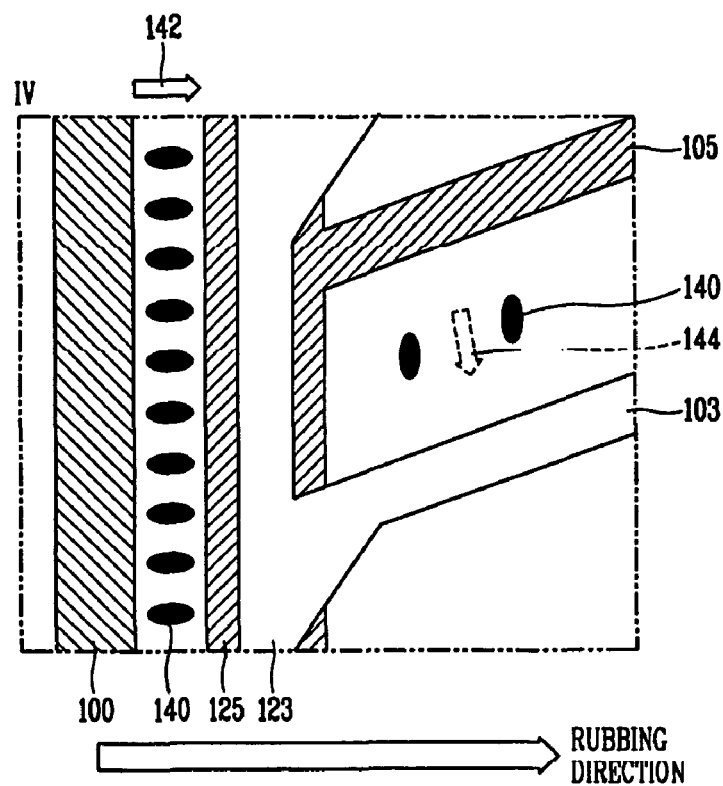

FIGS. 4C and 4D are enlarged views of the region IV shown in FIG. 3, illustrating driving characteristics of liquid crystal molecules when a voltage is applied to the common and pixel electrodes 105 and 103 and when a voltage is not applied thereto.

Although not shown in the drawings, an alignment film rubbed in the direction perpendicular to the data line 100, namely, in the same direction as a first electric field 142 formed between the data line 100 and the first pixel electrode line 123, is formed on the first substrate 110 including the pixel electrode 103 and the common electrode 105. In other words, in the first embodiment of the present invention, rubbing is performed in the direction that can induce an initial arrangement of liquid crystal molecules. Thus, the rubbing direction is the same as the direction of the first electric field 142 between the data line 100 and the first pixel electrode line 123 when a voltage applied thereto.

In the related art, the rubbing is performed in the 45°-tilt direction with respect to the direction of the data line 100. On the other hand, the rubbing is performed in the direction perpendicular to the data line 100 in an embodiment of the present invention, so that when no voltage is applied, liquid crystal molecules 140 positioned between the data line 100 and the first pixel electrode line 123 are arranged in the direction perpendicular to the data line 100, thereby not being distorted by a residual voltage.

As shown in FIG. 4D, when a voltage is applied to the common electrode 105 and the pixel electrode 103, the liquid crystal molecules 140 are arranged in the direction corresponding to the direction of a second in-plane electric field 144 generated between the common electrode 105 and the pixel electrode 103. In this case, since the first electric field 142 is formed in the direction perpendicular to the data line 100 between the data line 100 and the first pixel electrode line 123, the liquid crystal molecules 140 positioned at this area make no movement. Thus, the second in-plane electric field 144 may be formed between the common electrode 105 and the pixel electrode 103, and the liquid crystal molecules 140 position at this area are driven in the direction of the second electric field 144.

As a result, the rubbing direction of the alignment film is made perpendicular to the data line, and the common and pixel electrodes are disposed corresponding to the rubbing direction (preferably, the tilt angle of about 45° with the data line). Accordingly, distortion of the electric field due to the residual voltage of the data line can be minimized and a twisting phenomenon of the liquid crystal molecules can be prevented. Thus, light leakage at a corresponding region can be prevented even at a white/black mode.

However, the LCD device has such shortcomings that a vertical dim phenomenon occurs due to parasitic capacitances generated among the pixel electrode, the pixel electrode line and the data line. Therefore, a second embodiment of the present invention is directed to an IPS mode LCD capable of enhancing picture quality of the liquid crystal panel especially by removing the vertical line phenomenon.

The construction of the second embodiment is similar to that of the first embodiment, so only a different part and its effect will be described.

As illustrated, a liquid crystal panel includes a data line 200 and a gate line 201 arranged on a first substrate and defining a unit pixel region, a switching device TFT disposed at the crossing of the gate line 201 and the data line 200, and a plurality of pixel electrodes 203 and common electrodes 205 alternately arranged in parallel to each other in the pixel region and generating a in-plane electric field.

Although not shown in the drawing, an alignment film rubbed in a direction perpendicular to the data line 200 is coated on the first substrate, and the pixel electrodes 203 and the common electrodes 205 are formed at a tilt angle within a range of about 0°~45° to a direction perpendicular to the data line 200, to correspond to the rubbing direction of the alignment film.

The switching device TFT includes a gate electrode 207 formed as a portion of the gate line 201, a semiconductor layer (i.e., a channel region), a source electrode 213 formed by extending a portion of the data line 200, and a drain electrode 215 formed spaced apart with a certain distance from the source electrode 213. The pixel electrodes 203 receive a data signal from the switching device TFT through a first contact hole 227 formed at an upper portion of the drain electrode 215.

In the unit pixel region, a pixel electrode line 223 connecting the plurality of pixel electrodes 203 is disposed to be adjacent and in parallel with the data line 200 of the corresponding pixel, and a common electrode line 225 connecting the plurality of common electrodes 205 are disposed to be adjacent and in parallel with the data line 200' of the neighboring pixel in the extended direction of the gate line 201. Namely, the pixel electrode line 223 and the common electrode line 225 face each other with the pixel electrodes 203 and the common electrodes 205 interposed therebetween.

The pixel electrode line 223, the common line 225, the pixel electrodes 203 and the common electrodes 205 are formed of a transparent conductor, such as indium tin oxide (ITO), indium zinc oxide (IZO) or indium tin zinc (ITZ), to thereby increase luminance of the LCD device.

The unit pixel region additionally includes a common line 225' of a metal layer for transmitting a common signal at a central portion of the pixel. The common electrode 205 receives the common signal through a second contact hole 227' formed at an upper portion of the common line 225', and a pixel electrode 223' protruded from the pixel electrode line 223 overlaps the common line 225', thereby forming a storage capacitor. The pixel electrode 203 and the common electrode 205 are disposed symmetrically with respect to the common line 225', thereby forming two domains in the unit pixel region.

The gate line 201 can be formed parallel to the adjacent pixel electrode 203 or common electrode 205 and can extend in a zig-zag form over the entire area of the liquid crystal panel, and two pixel regions adjacent at the boundary of the gate line 201 can be symmetrically formed. The unit pixel region of the LCD device can be symmetrically formed with an adjacent pixel region at the boundary of the data line 200'.

As mentioned above, the second embodiment of the present invention features that the pixel electrode line 223 and the common electrode line 225 are disposed to face each other with the plurality of pixel electrodes 203 and the common electrodes 205 interposed therebetween. In this structure, the common electrode line 205 prevents a data signal of the data line 200' of a neighboring pixel from the pixel electrode 203 and the pixel electrode line 223, so that influence of a parasitic capacitance that can be generated due to the data line 200' of the neighboring pixel can be minimized.

With such a structure, the problem of luminance non-uniformity of each pixel resulting from a difference of the parasitic capacitance among pixels in the horizontal 2-dot inversion driving, in which horizontally adjacent two pixels are driven centering on one pixel so as to have the opposite polarity, can be solved. This features will now be described with reference to FIGS. 6A to 9.

In general, pixels on the liquid crystal panel are driven by an inversion driving method such as one of a frame inversion system, a line inversion system and a dot inversion system. Among them, the frame inversion system inverts a polarity of a data signal supplied to pixels on the liquid crystal panel whenever a frame is changed. The line inversion system inverts the polarity of data signals supplied to corresponding pixels according to each gate line. The dot inversion system supplies a data signal with an opposite polarity to pixels adjacent up and down and left and right, and inverts the polarity of data signals supplied to every pixel on the liquid crystal panel at each frame. Among the inversion driving systems, the dot inversion system provides an image with excellent picture quality compared with the frame and line inversion systems.

The related art LCD device is generally driven by a frame frequency of about 60 Hz, and a system such as a notebook computer requires low power consumption, so that the frame frequency needs to be lowered to about 50 to 30 Hz. In order to meet such demands, an LCD panel driving method of a horizontal 2-dot inversion system which requires low power consumption has been proposed.

FIGS. 6A and 6B illustrate data polarity patterns supplied to pixels of the liquid crystal panel according to the driving method of a 2,1-dot inversion system, among the horizontal 2-dot inversion systems, with respect to an odd number frame and an even number frame.

In the horizontal 2,1-dot inversion driving method, in the odd number frame as shown in FIG. 6A and the even number frame as shown in FIG. 6B, a data polarity pattern is changed by units of 2 pixels, namely, by units of 2 dots, in a horizontal direction and changed by units of 1 dot in a vertical direction. Meanwhile, although not shown in the drawing, in a horizontal 2,2-dot inversion driving system, the data polarity pattern is changed by units of 2 dots in horizontally and vertically adjacent pixels.

When the horizontal 2-dot inversion system is employed, a period at which sequentially aligned R, G and B pixels and a polarity pattern of a data signal meet is horizontally 12 dots, so that a DC voltage is no more applied to the data line in the almost general screen, thereby reducing a flicker phenomenon.

However, in case of using the horizontal 2-dot inversion system, luminance difference occurs among pixels corresponding to odd number data lines and even number data lines in a middle gray scale screen, causing the vertical line phenomenon. Namely, the vertical line phenomenon is caused by non-uniformity of parasitic capacitance between the data line and the pixel electrode. This will now be described in detail as follows.

Figure 7:
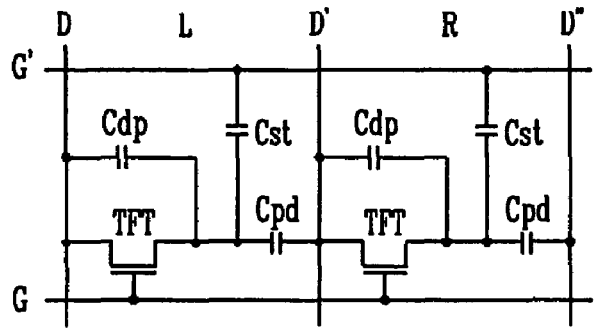
FIG. 7 is a schematic circuit diagram of two pixels, which are horizontally adjacent to each other and have the same polarity in accordance with an embodiment of the present invention.
Figure 8:
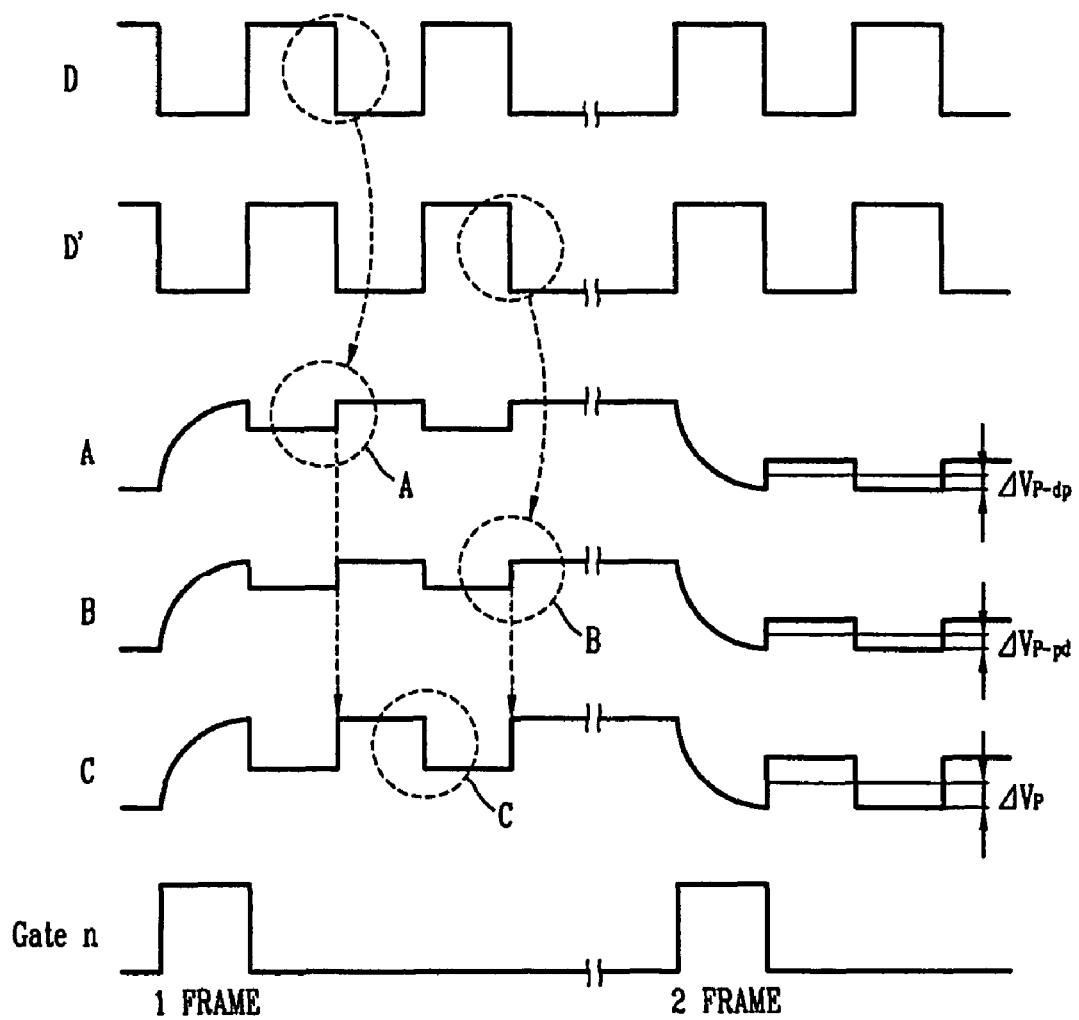
FIG. 8 illustrates signal waveforms showing a variation of a pixel voltage due to parasitic capacitance in the pixels shown in FIG. 7.

FIG. 7 is a schematic circuit diagram of two pixels which are horizontally adjacent to each other and receive data signals with the same polarity, and FIG. 8 illustrates signal waveforms showing a variation of a pixel voltage due to parasitic capacitance in the pixels shown in FIG. 7. As shown in FIG. 7, a unit pixel region of the LCD device includes a data line D, a gate line G, a switching device TFT formed at the crossing of the data line D and the gate line G, and a pixel electrode connected with the switching device TFT.

More specifically, the switching device TFT includes a gate electrode connected with the gate line G, a source electrode connected with the data line D, and a drain electrode connected with the pixel electrode. When the switching device TFT receives a scan signal, such as a gate high voltage (VGH), from the gate line G, it is turned on and transfers a data signal transmitted from the data line D to a pixel.

When a gate low voltage (VGL) is supplied from the gate line G, the switching device TFT is turned off and maintains the data signal charged in the pixel. In order to stably maintain the data signal until the next data signal is charged in the pixel electrode, a storage capacitor Cst is provided in the pixel. In general, the storage capacitor Cst is formed between a pixel electrode and the front stage gate line G'.

Parasitic capacitance is generated between the data lines D, D' and D" and the pixel electrode in the pixel region. The parasitic capacitance exists as a first parasitic capacitance Cdp between the left data line D and the pixel electrode, and as a second parasitic capacitance Cpd between the pixel electrode and the right data line D'. After the data signal is charged in each pixel, the first and second parasitic capacitances Cdp and Cpd generate variation of a voltage of the data line and capacitance coupling, thereby changing the voltage of the pixel.

When pixels are driven by the horizontal 2-dot inversion system, in two pixels, namely, in the left pixel (L) and the right pixel (R) where the same polarity of voltage is distributed in the horizontal direction, an influence of an average variation value ($\Delta Vp-dp$) of a pixel voltage (A) according to the capacitance coupling of the first parasitic capacitance Cdp and an influence of an average variation value ($\Delta Vp-pd$) of a pixel voltage (B) according to the capacitance coupling of the second parasitic capacitance Cpd can be different from each other.

The average variation value ($\Delta Vp-dp$) of a pixel voltage (A) according to the capacitance coupling of the first parasitic capacitance Cdp and the average variation value ($\Delta Vp-pd$) of a pixel voltage (B) according to the capacitance coupling of the second parasitic capacitance Cpd can be expressed by equation (1) shown below:

$$\Delta Vp = \{Cdp \times V(DLm-1) + Cpd \times V(DLm)\}/C\text{total} \quad (1)$$

wherein Ctotal is an overall capacitance of the pixel electrode.

That is, likewise in the horizontal 1-dot inversion driving system, the right pixel (R) has a data signal with the opposite polarity to that of the rightwardly adjacent pixel, so that a value of the first parasitic capacitance Cdp and a value of the second parasitic capacitance Cpd affect each other such that they are mutually offset. Comparatively, in case of the left pixel (L), The average variation value ($\Delta Vp-dp$) of a pixel voltage (A) according to the capacitance coupling of the first parasitic capacitance Cdp and the average variation value ($\Delta Vp-pd$) of a pixel voltage (B) according to the capacitance coupling of the second parasitic capacitance Cpd are not mutually offset but added (C) to make a different influence from that of the right pixel (R).

Figure 9:
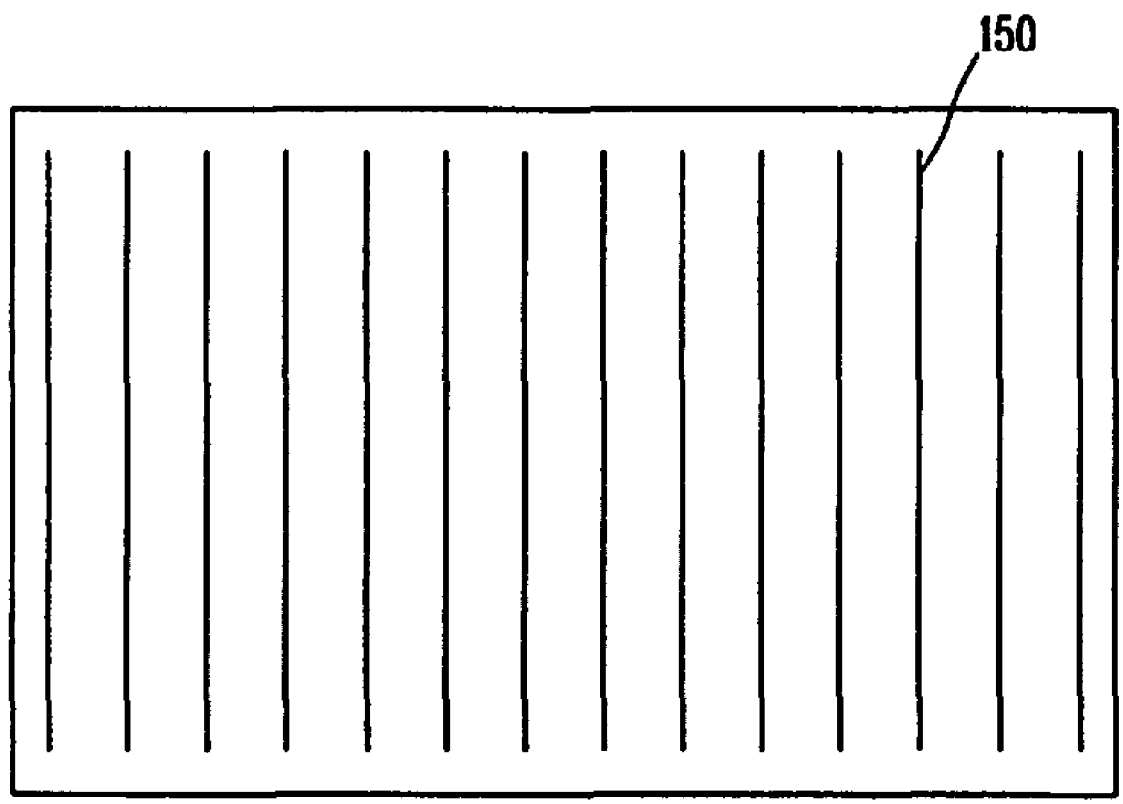
FIG. 9 illustrates vertical lines appearing on the liquid crystal panel due to a capacitance coupling phenomenon due to the parasitic capacitance of the liquid crystal display device in accordance with an embodiment of the present invention.

In other words, at the left pixel (L), if the value of the first parasitic capacitance Cdp and the value of the second parasitic capacitance Cpd are the same, an effective value of the pixel voltage as much as double the value $\Delta Vp-dp$ is changed compared with the right pixel (R). As shown in FIG. 9, the right pixel (R) becomes brighter than the left pixel (L). As a result, in the LCD device driven according to the horizontal 2-dot inversion driving method, the vertical lines 150 appear due to the luminance difference among adjacent pixels.

Therefore, in the second embodiment of the LCD in accordance with the present invention, in order to minimize the influence of the second parasitic capacitance in the unit pixel, the first and second parasitic capacitances Cdp and Cpd are formed to be different in size, to thereby compensate for the luminance difference generated due to the non-uniform capacitance. Thus, the vertical line phenomenon is prevented.

Figure 5:
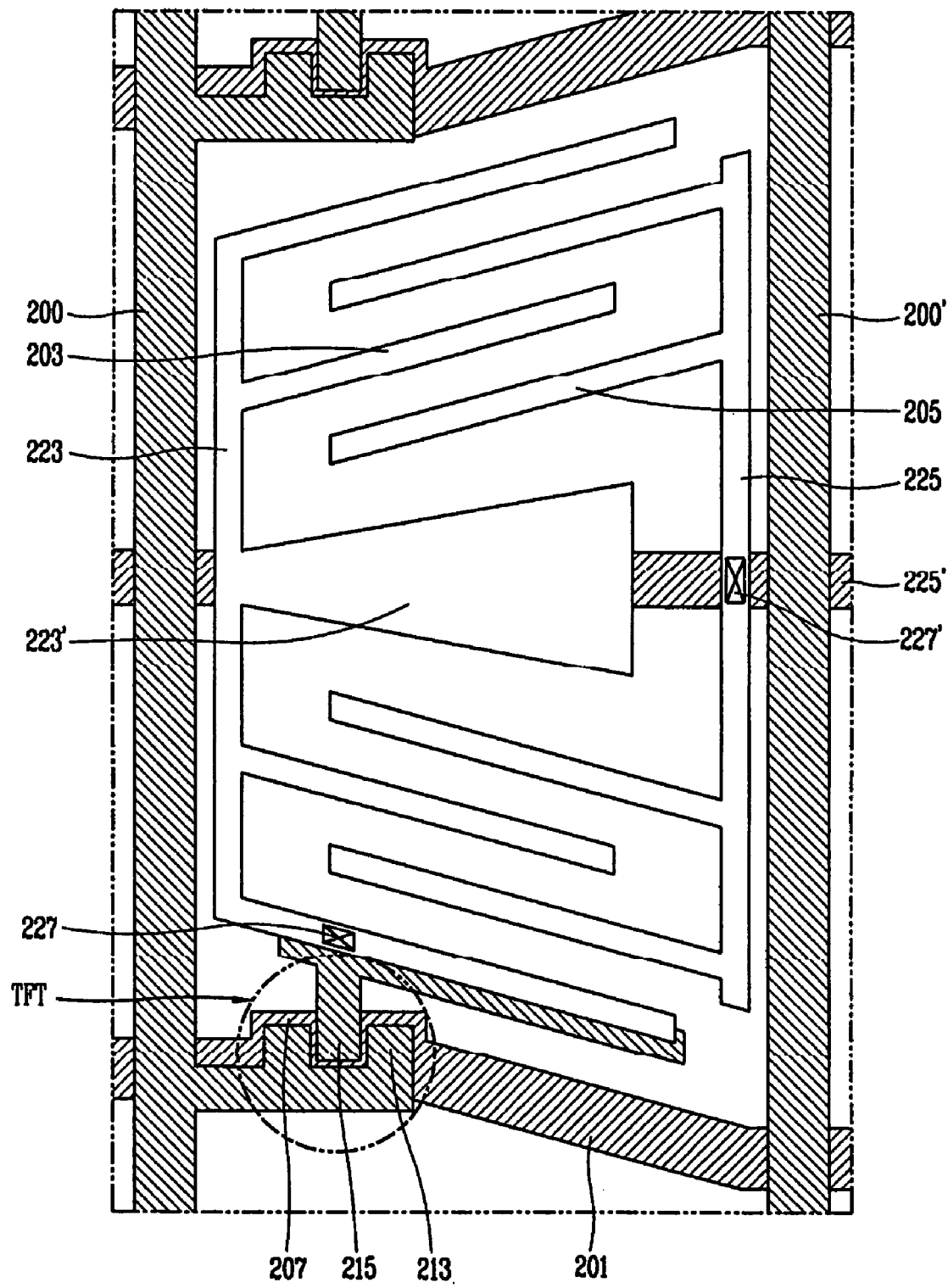
FIG. 5 is a plan view showing a unit pixel of a liquid crystal display device in accordance with a second embodiment of the present invention.

Consequently, as shown in FIG. 5, since the pixel electrode line 223 and the pixel electrodes 203 are disposed to be separated from the data line 200' of the neighboring pixel, the influence of the parasitic capacitance (Cpd) resulting from the data signal of the neighboring data line 200' can be minimized. Therefore, the influence of capacitance coupling at the left pixel (L) and the right pixel (R) having the horizontally same polarity can be compensated and deviation of the pixel voltage of the left and right pixels can be offset. As such, in an embodiment of the present invention, the vertical lines resulting from the difference of parasitic capacitance between the data line of each pixel and the pixel electrode do not appear.

Figure 10:
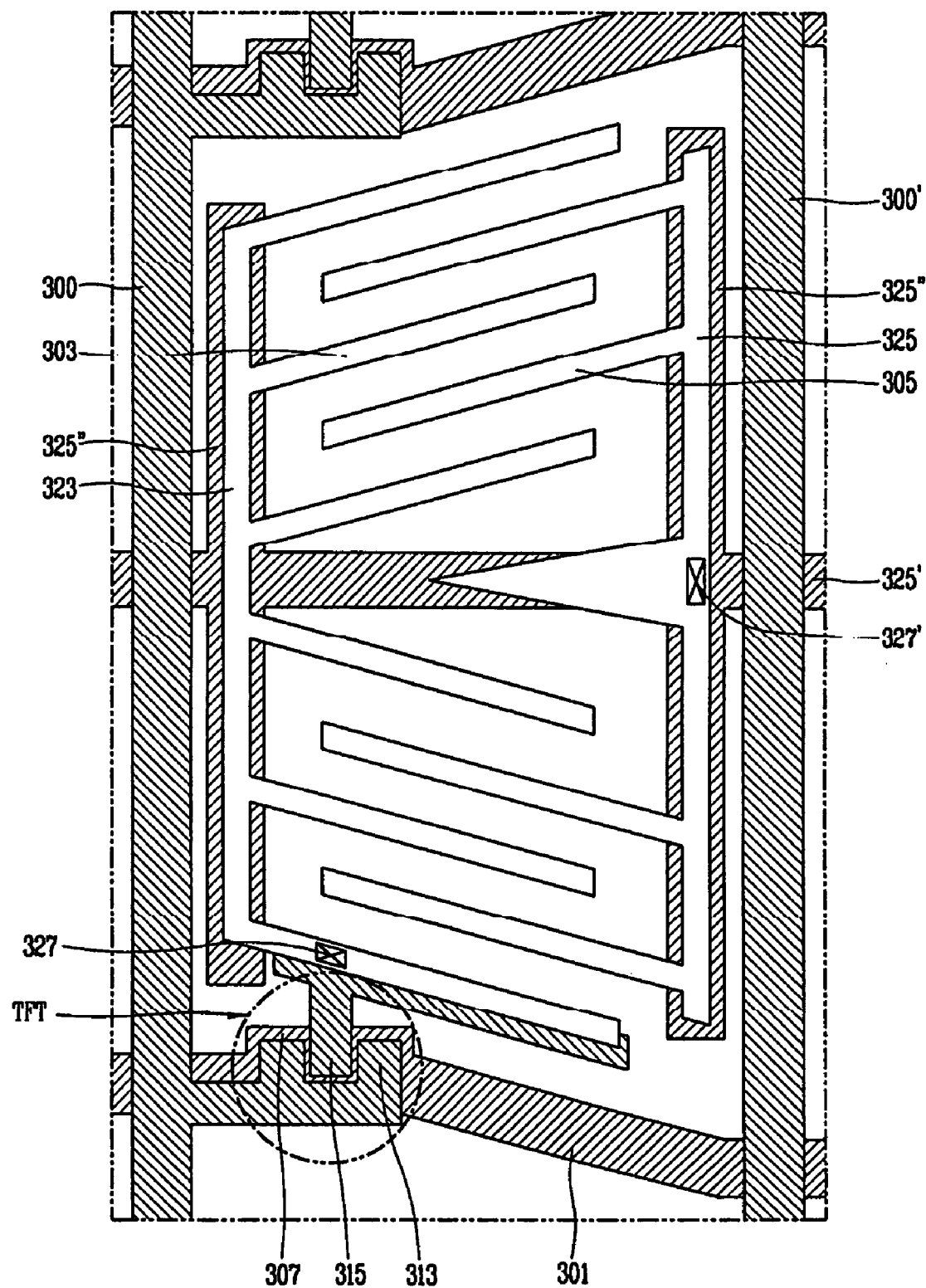
FIG. 10 is a plan view showing a unit pixel of a liquid crystal display device in accordance with a third embodiment of the present invention.

FIG. 10 is a plan view showing a unit pixel of an LCD device in accordance with a third embodiment of the present invention. The construction of the third embodiment is similar to that of the second embodiment, so only its difference and effect will be described in detail.

As shown in FIG. 10, a liquid crystal panel in accordance with the third embodiment of the present invention includes a data line 300 and a gate line 301 arranged on a first substrate and defining a unit pixel region, a switching device TFT disposed at a crossing of the data line 300 and the gate line 301, and a plurality of pixel electrodes 303 and common electrodes 305 alternately arranged in parallel to each other in the pixel region and generating an in-plane electric field.

Although not shown in the drawing, an alignment film rubbed in a direction perpendicular to the data line 300 is coated on the first substrate, and the pixel electrodes 303 and the common electrodes 305 are formed to have a tilt angle in a range of 0°~45° with respect to a direction perpendicular to the data line 300, thereby to correspond to the rubbing direction of the alignment film.

The switching device TFT includes a gate electrode 307 formed as a portion of the gate line 301, a semiconductor layer (not shown), a source electrode 313 and a drain electrode 315. The pixel electrode 303 receives a data signal from the switching device TFT through a first contact hole 327 formed on the drain electrode 315.

In the unit pixel region, a pixel electrode line 323 connecting the plurality of pixel electrodes 303 is disposed to be adjacent and in parallel to the data line 300 of the corresponding pixel, and the common electrode line 325 connecting the plurality of common electrodes 205 are disposed to be adjacent and in parallel with the data line 300' of the neighboring pixel in the extended direction of the gate line 301. Namely, the pixel electrode line 323 and the common electrode line 325 face each other with the pixel electrodes 303 and the common electrodes 305 interposed therebetween.

The pixel electrode line 323, the common line 325, the pixel electrodes 303 and the common electrodes 305 are formed of a transparent conductor such as indium tin oxide (ITO), indium zinc oxide (IZO) or indium tin zinc (ITZ), to thereby increase luminance of the LCD device.

The unit pixel region in accordance with the third embodiment of the present invention additionally includes a common line 325' of a metal layer for transmitting a common signal at a central portion of the pixel. The common electrode 305 receives the common signal through a second contact hole 327' formed at an upper portion of the common line 325'. The pixel electrodes 303 and the common electrodes 305 are disposed symmetrically with respect to the common line 325', thereby forming two domains in the unit pixel region.

A metal layer 325'' is formed as an extended portion of the common line 325' at a lower portion of the pixel electrode line 323 and the common electrode line 325. The metal layer 325'' prevents a data signal of the adjacent data lines 300 and 300'. Especially, the metal layer 325'' positioned at the lower portion of the pixel electrode line 323 overlaps the pixel electrode line 323 to form a storage capacitor.

The gate line 301 can be formed parallel to the adjacent pixel electrode 303 or common electrode 305 and can extend in a zig-zag form over the entire area of the liquid crystal panel, and two pixel regions adjacent at the boundary of the gate line 301 can be symmetrically formed.

As mentioned above, the third embodiment of the present invention features that the pixel electrode line 323 and the common electrode line 325 are disposed to face each other with the plurality of pixel electrodes 303 and the common electrodes 305 interposed therebetween. In this structure, the common electrode line 325 and the metal layer 325'' positioned at the lower portion of the common electrode line 325 prevent a data signal of the neighboring data line 300' from the pixel electrode 303 and the pixel electrode line 323, so that influence of a parasitic capacitance that can be generated due to the data line 300' can be minimized.

With such structure, the problem of luminance non-uniformity of each pixel resulting from a difference of the parasitic capacitance among pixels in the horizontal 2-dot inversion driving, in which horizontally adjacent two pixels are driven centering on one pixel so as to have the opposite polarity, can be solved.

As so far described, the IPS mode LCD device in accordance with an embodiment of the present invention has various advantages as follows.

That is, for example, since the rubbing direction is made perpendicular to the data line and the pixel electrode line, liquid crystal molecules positioned near the data line can maintain their initial alignment direction regardless of whether a voltage is applied thereto. Thus, distortion of liquid crystal due to a residual voltage of the data line in a voltage-OFF state and leakage of light can be prevented. In addition, picture quality can be enhanced by preventing a change of the color sense due to signal distortion of the data line.

Moreover, since the pixel electrode and the pixel electrode line are disposed to be separated from the data line of a neighboring pixel, influence of parasitic capacitance according to a data signal of the neighboring data line can be minimized in the horizontal 2-dot inversion driving. Accordingly, the vertical lines do not appear on the display screen and the picture quality of the liquid crystal panel can be enhanced.

It will be apparent to those skilled in the art that various modifications and variation can be made in the in-plane switching mode liquid crystal display device of the present invention without departing from the spirit or scope of the invention. Thus, it is intended that the present invention cover the modifications and variations of this invention provided they come within the scope of the appended claims and their equivalents.

What is claimed is:

1. An in-plane switching mode liquid crystal display device, comprising:
   first and second substrates;
   a gate line on the first substrate;
   a data line crossing the gate line defining a unit pixel region on the first substrate;
   a thin film transistor at the crossing of the gate line and the data line on the first substrate;

a pixel electrode line in parallel with the data line on the first substrate;

a plurality of pixel electrodes extended from the pixel electrode line on the first substrate;

a common electrode line adjacent to a data line of a neighboring pixel, the common electrode line being parallel with the data line on the first substrate;

a plurality of common electrodes protruded from the common electrode line and alternately arranged in parallel with the plurality of pixel electrodes on the first substrate to generate an in-plane electric field substantially parallel to the surface of the first substrate;

a common line traversing a central portion of the unit pixel region in a direction perpendicular to the data line and supplying a common signal to the common electrodes, wherein a second common electrode line extended from the common line is substantially overlapped with the common electrode line and electrically connected to the common electrode line;

a first metal layer and a second metal layer parallel to the data line;

a third metal layer connecting the thin film transistor and the pixel electrode;

an alignment film on the first substrate, the alignment film having a rubbing direction perpendicular to the data line and the common electrode line and oblique from the pixel electrodes and the common electrodes in a predetermined angle; and a liquid crystal layer between the first and second substrates, wherein the common line overlaps the pixel electrode line to form a storage capacitor, wherein a length of the common electrode line is substantially the same as a length of the second common electrode line, and wherein the plurality of the common electrodes are connected to the common electrode line within the unit pixel region, wherein the pixel electrode is disposed with a tilt angle within a range of about 0°~45° in a direction perpendicular to the second common line, wherein the first metal layer and the second metal layer are respectively overlapped with the pixel electrode line and the common electrode line to form a storage capacitor, width of the first metal layer and the second metal layer being larger than that of the pixel electrode line and the common electrode line so that the whole area of pixel electrode line and the common electrode line are respectively overlapped with the first metal layer and the second metal layer, wherein the third metal layer is parallel to the gate line to be overlapped with the pixel electrode, the third metal layer is extended from the thin film transistor and contacted to the pixel electrode through a first contact hole.

2. The liquid crystal display device according to claim 1, wherein the common electrode line prevents a data signal of the data line of the neighboring pixel.

3. The liquid crystal display device according to claim 1, wherein the device is driven by a horizontal 2-dot inversion system.

4. The liquid crystal display device according to claim 1, wherein the common electrodes are formed with a tilt angle within a range of about 0°~45° with respect to a direction perpendicular to the data line.

5. The liquid crystal display device according to claim 1, wherein the thin film transistor includes a gate electrode, a semiconductor layer, a source electrode, a drain electrode, and a passivation layer.

6. The liquid crystal display device according to claim 5, wherein the passivation layer has the first contact hole for electrically connecting the drain electrode and the pixel electrodes.

7. The liquid crystal display device according to claim 1, wherein the pixel electrode line, the pixel electrodes, the common electrodes and the common electrode line are formed of a transparent conductor.

8. The liquid crystal display device according to claim 7, wherein the transparent conductor includes one of indium tin oxide, indium zinc oxide, and indium tin zinc.

9. The liquid crystal display device according to claim 1, wherein the common line is formed of a metal layer.

10. The liquid crystal display device according to claim 1, wherein the common line has a second contact hole for electrically connecting the common line and the common electrodes.

11. The liquid crystal display device according to claim 1, wherein the pixel electrodes and the common electrodes are formed to be symmetrical with respect to the common line, thereby forming two domains in the unit pixel region.

12. The liquid crystal display device according to claim 1, wherein the metal layer prevents a data signal of the data line.

13. The liquid crystal display device according to claim 1, wherein the gate line is formed in parallel with the adjacent common electrode or pixel electrode and extends in a zig-zag form.

14. The liquid crystal display device according to claim 1, wherein the pixel region is formed to be symmetrical with an adjacent pixel region at a boundary of the gate line.

15. The liquid crystal display device according to claim 1, wherein the unit pixel region is formed symmetrically with the neighboring adjacent pixel at a boundary of the data line.

16. The liquid crystal display device according to claim 1, wherein the common line divides the unit pixel into first and second sub-pixels, and wherein the pixel electrodes and the common electrodes in the first and second sub-pixels are symmetrically inclined at about 0°~45° with respect to the rubbing direction.

17. The liquid crystal display device according to claim 16, further comprising a second gate line, wherein the gate line is adjacent to and inclined substantially parallel with the pixel electrodes and the common electrodes in the first sub-pixel, and wherein the second gate line is adjacent to and inclined substantially parallel with the pixel electrodes and the common electrodes in the second sub-pixel.

* * * * *